United States Patent [19]
Miyata

[11] Patent Number: 4,838,834
[45] Date of Patent: Jun. 13, 1989

[54] SPEED-SHIFTING DEVICE

[75] Inventor: Hirofumi Miyata, Kobe, Japan

[73] Assignee: Bando Chemical Industries, Ltd., Kobe, Japan

[21] Appl. No.: 174,887

[22] Filed: Mar. 29, 1988

[30] Foreign Application Priority Data

Mar. 31, 1987 [JP] Japan ................................................. 78818
Aug. 20, 1987 [JP] Japan ................................................ 208007

[51] Int. Cl.⁴ ............................................. F16H 11/02
[52] U.S. Cl. ...................................... 474/11; 74/866; 474/28
[58] Field of Search ..................... 474/11, 12, 17, 18, 474/24, 28, 29–34, 69, 70, 84–89; 74/866–869

[56] References Cited

U.S. PATENT DOCUMENTS 2,253,357  8/1941  Wetzel .............................. 474/11 X
4,056,987 11/1977  Hoffman ........................... 474/32 X
4,484,901 11/1984  Toti et al. ............................ 474/28

Primary Examiner—Thuy M. Bui
Attorney, Agent, or Firm—Wenderoth, Lind & Ponack

[57] ABSTRACT

A pulley type speed-shifting device is provided with a driving pulley and driven pulley mounted on each transmission shaft which are parallel, and a belt member is trained between both pulleys. A moving member is connected for movement in the axial direction with one sideplate of the driving pulley and is axially moved on the movable sideplate through screw motion caused by relative rotation around the transmission shaft. A speed-shifting pulley mechanism is provided for rotating the moving member relatively around the transmission shaft to change the transmission ratio between the transmission shafts in accordance with a required mode change.

9 Claims, 7 Drawing Sheets

SPEED-SHIFTING DEVICE

BACKGROUND OF THE INVENTION

1. Field of the Invention

This invention relates to an improvement of a variable speed pulley type speed-shifting device utilizing a belt drive in motor cycles, agricultural implements, and the like.

2. Description of the Prior Art

Conventionally, as a variable speed pulley type speed-shifting device utilizing belt drive a well known device, for example, composes a pair of an input and output shafts placed parallely, variable speed pulleys composed of fixed sideplates solidly rotatably and axially non-slidably mounted to each shaft and movable sideplates solidly rotatably and axially slidably mounted on each shaft forming V-shaped belt grooves with the fixed sideplates facing thereto, and a belt member trained to the belt grooves between both sideplates, arranged so that the transmission ratio between the shafts is adjusted in the manner that the effective radius of the pulleys for the belt member is changed by moving axially the movable sideplates of each pulley toward and away from the fixed sideplates. Usually, working of the above-mentioned movable sideplates of each pulley is controlled by utilizing hydraulic equipment. Nevertheless, in the case utilizing the hydraulic equipment, a piping system for the hydraulic equipment is required. Also, there are problems that the control of the working of the movable sideplates is complicated, and the device needs a large space.

A device in which the movable sideplates of variable pulleys may be automatically operated, for example, is disclosed in published Japanese application No. 59-62760 in which is provided a pair of transmission shafts, male screw cylinders axially non-slidably and rotatably mounted to the transmission shafts, female screw cylinders solidly movable in the axial direction and rotatably mounted to the movable sideplates of variable speed pulleys on the transmission shafts engaged with guide grooves of supporting flanges of the male screw cylinder with a certain play, arranged so as to adjust the effective radius of the pulleys by changing the distance between the fixed sideplates and the movable sideplates of the variable speed pulleys by screw motion of rotating the male screw cylinders to move the female screw cylinders by a servomotor adapted as an actuator.

However, this proposed device has a problem that controlling for operation of the servomotor and the construction of the device is complicated since the movable sideplates of the pulleys are working by screw motion in order to move the female screw cylinder by an output of the servomotor. Also, the cost is high since installing the servomotor is expensive.

This invention has been made in view of the above disadvantages and its object is to provide a speed-shifting device wherein the working of the movable sideplates is easy to control with a simple, durable and low cost arrangement by moving the sideplate by utilizing the rotational power of the transmission shaft effectively.

SUMMARY OF THE INVENTION

In order to attain these objects, the speed-shifting device of this invention is provided with a moving member composed of a screw member and the like for moving axially the movable sideplates of the variable speed pulleys, arranged so that by the relative rotation thereof on the transmission shaft the movable sideplates are moved axially by utilizing another speed-shifting pulley mechanism.

Concretely, this invention provides a speed-shifting device comprising a pair of transmission shafts placed parallely, a driving pulley and a driven pulley each of which is composed of fixed sideplates solidly rotatably and axially no n-slidably mounted to each said transmission shaft and movable sideplates axially slidably and solidly rotatably mounted on each of the transmission shafts forming V-shaped grooves with the fixed sideplates, and a belt member trained between both said pulleys engaging with both the V-shaped grooves thereof, arranged so that the transmission ratio between the transmission shafts can be change by varying the effective radius of the engagement of each pulley with the belt member by the movement of each movable sideplate axially toward and away from the fixed sideplate facing thereto.

A moving member solidly movable in the axial direction is provided and is relatively rotatably connected to the movable sideplate of the pulley on the first transmission shaft, being relatively rotatably and axially movably supported on the first transmission shaft through a screw engagement of the like.

Also, a speed-shifting pulley mechanism including the second pulley member solidly rotatably mounted on the first transmission shaft, the third pulley member which is rotatably mounted on the second transmission shaft and consists of two pulley parts, the first belt trained between the second pulley member and one of the pulley parts of the third pulley member, and the second belt trained between the other pulley part of the third pulley member and the first pulley member of the moving member are provided to rotate the moving member relatively to the first transmission shaft so that the rotation of the first transmission shaft is transmitted to the moving member with shifted speed through both belt.

The speed-shifting pulley mechanism, specifically, consists of the second pulley member functioning as a variable pulley the effective radius of which is changeable, the former pulley part of the third pulley member functioning as a fixed pulley the effective radius of which is unchangeable, the latter pulley part and the first pulley member of the moving member having toothed pulley parts, the first belt composed of a V-belt, and the second belt composed of a timing belt. The first belt is given tension by a biased roller. The rotation of the first transmission shaft is transmitted to the moving member with shifted speed through the speed-shifting pulley mechanism by adjusting the radius of the second pulley member.

The second pulley member is provided with a movable sideplate connected to the moving member through a cam mechanism and a fixed sideplate facing thereto. The cam mechanism is composed of a drive cam solidly movable in the axial direction and relatively rotatably mounted on the moving member as well as being connected axially movably and non-rotatably with a casing of the device, and a driving cam solidly movable in the axial direction and relatively rotatably mounted on the movable sideplate, arranged so that both cams are connected in cam engagement with each other to have the relative positions actually changed by relative rotation.

In that case, there are two purposes. One is to reduce greatly the handling force required when shifting speed by enlarging the link ratio as the ratio of a moving stroke of the driving pulley to that of an operating lever. The other one is to control so as not to increase abruptly the handling force by avoiding an axial movement of the moving member and the movable sideplate of the driven pulley when the operating lever is handled more quickly than the moving speed of the movable sideplate, since the cam face angle at the cam mechanism is determined by the stroke of the operating lever for speed-shifting and the moving range for speed-shifting at the driven pulley when the cam mechanism is utilized as a mechanism for adjusting the effective radius of the second pulley member to increase or to reduce the diameter. In order to attain these objects, the below-mentioned arrangement is adopted.

Namely, in a speed-shifting device including the above-mentioned arrangement, the second pulley member which is a part of the speed-shifting pulley member is composed of a pair of first and second movable sideplates solidly rotatably and axially slidably mounted on said first transmission shaft facing thereto. The first movable sideplate is connected with the moving member by screw engagement with a smaller pitch than the engagement between the moving member and the first transmission shaft, and the second movable sideplate is connected with the operating lever.

The speed-shifting pulley mechanism is arranged so that the rotation of the second pulley member is transmitted to the moving member with shifted speed through both belts by changing the effective radius of the second pulley member with the first belt in accordance with the distance between the movable sideplates thereof that is varied by a mode change of the operating lever for moving the second movable sideplate toward and away from the first movable sideplate, and the above-mentioned speed-shifting transmission is stabilized in the constant speed condition, by moving the first movable sideplate toward and away from the second sideplate with a smaller movement than that of the moving member based on the difference of the screw pitch between the screws of the first transmission shaft and that of the movable sideplate engaging with the moving member.

Specifically, the first pulley part of the third pulley member may be a fixed pulley the effective radius of which is unchangeable, the third pulley member and the pulley part of the moving member may be a toothed pulley, the first belt may be a V-belt and given tension by a bias roller and, the seond belt may be a timing belt.

The second movable sideplate is connected with the operating lever through a cam member which is axially moved by cam engagement with the casting of the device and a linking mechanism which is connected with the cam mechanism.

As another arrangement of the speed-shifting pulley, the third pulley member can be axially rotatably mounted on a shaft placed parallely with the first and second transmission shafts.

Further, the driving and driven pulleys can be optionally provided on the first or second transmission shaft. For example, when the first transmission shaft is an input shaft and the second transmission shaft is an output shaft, the driving pulley is mounted on the first transmission shaft and the driven pulley is mounted on the second transmission shaft.

DESCRIPTION OF THE PREFERRED EMBODIMENTS

Embodiments of this invention are described below, with reference to the drawings.

Figure 1:
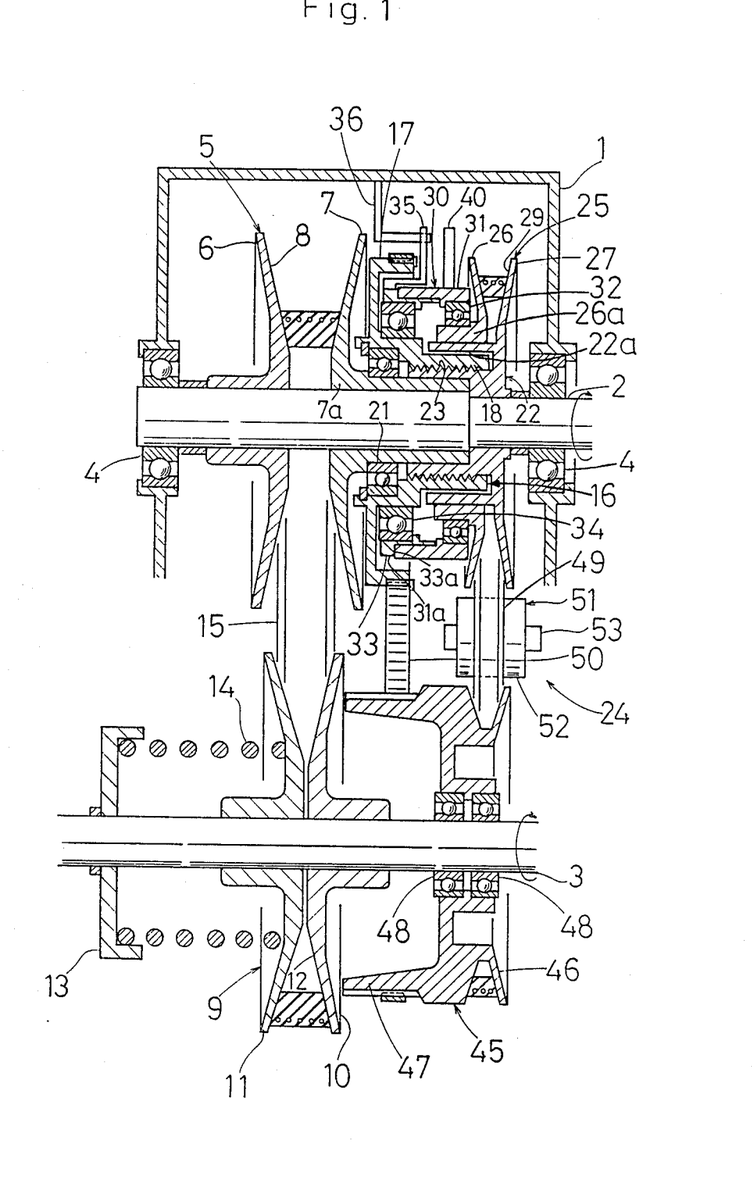
FIG. 1 is a sectional elevation of a front embodiment of a speed-shifting device of the invention in the low speed mode.
Figure 2:
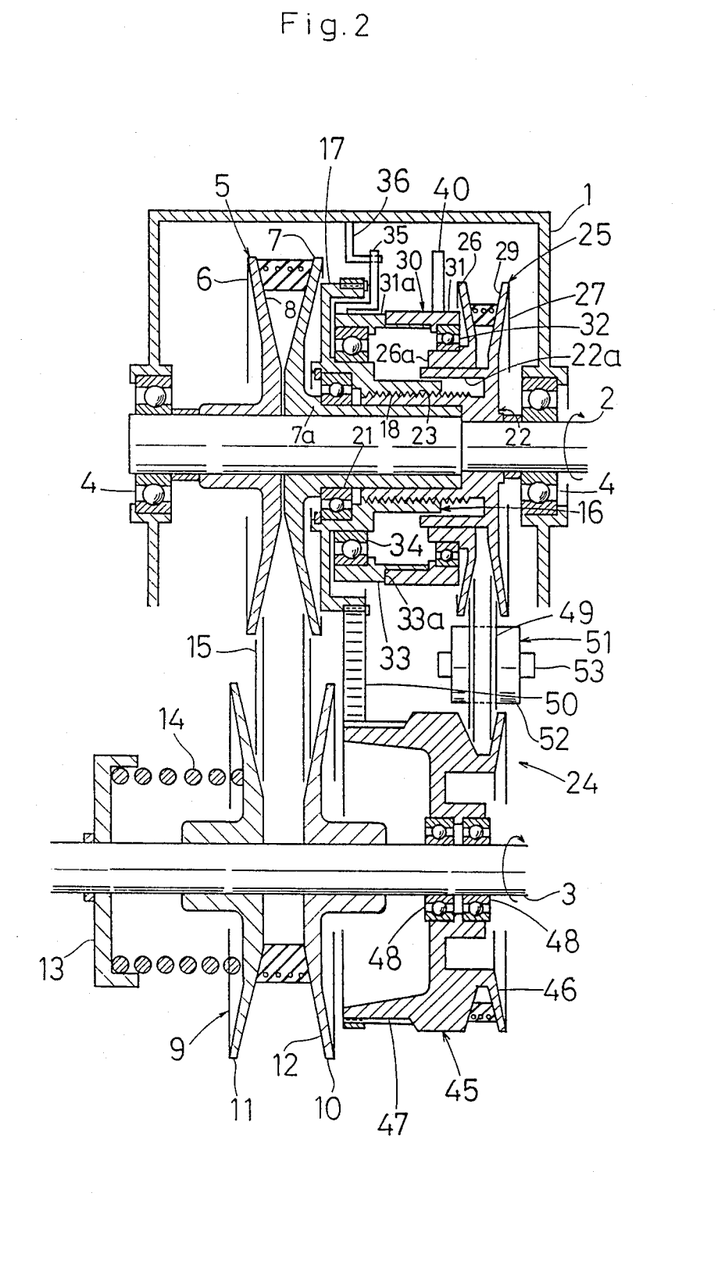
FIG. 2 is a view similar to FIG. 1 of the speed-shifting device in the high speed mode.

FIG. 1 and FIG. 2 show arrangements of a pulley type speed-shifting device according to the first embodiment of this invention wherein both an input shaft 2 as the first transmission shaft in this invention and an output shaft 3 as the second transmission shaft placed parallely with the input shaft 2 are supported rotatably by a casing 1 of the device through ball bearings 4. A driving pulley 5 is provided on the input shaft 2. The driving pulley 5 is composed of a flange shaped fixed sideplate 6 solidly rotatably and axially non-slidably mounted on the input shaft 2 with a key or the like, and a flange shaped movable sideplate 7 axially slidably and rotatably fixedly mounted on the input shaft 2 with a key or the like at a boss part 7a so as to face to the fixed sideplate 6. Thereby a V-shaped belt groove 8 is formed between the two sideplates 6 and 7.

A driven pulley 9 is mounted on the output shaft 3. This driven pulley 9 is arranged the same as the driving pulley 5, being composed of a flange shaped fixed sideplates 10 fixedly rotatably and axially non-slidably mounted on the output shaft 3 with a key or the like and a flange shaped movable sideplate 11 axially slidably and rotatably fixedly with a key or the like on the output shaft 3 so as to face to the fixed sideplate 10 in the opposite direction from the direction the movable sideplate 7 faces the fixed sideplate 6 in the driving pulley 5 on the input shaft 3. A V-shaped groove is also formed between these sideplates 10 and 11. Also, a spring retainer 13 is solidly rotatably and axially unmovably fixed on the output shaft 3 at a rear side of the movable sideplate 11 of the driven pulley 9. A spring 14 is disposed for biasing the movable sideplate 11 toward the fixed sideplate 10 (the right direction in the figure) between the spring retainer 13 and the rear side of the movable sideplate 11. Also, a V-belt 15 serving as a belt member is trained between pulley 3 and pulley 7 engaging with both belt grooves 8 and 12 thereof. The effective radius of the engagement of the V-belt 15 with both pulleys 3 and 7 is adjustable by the movement of the movable sideplate 7 of the driving pulley 5 toward and away from the fixed sideplate 6. For example, when the movable sideplate 7 is moved toward the fixed sideplate 6, the transmission ratio between shafts 2 and 3 is increased resulting from the decrease of the effective radius of the driven pulley 9 to less than that of the driving pulley 5 movement of the movable sideplate 11 of the driven pulley 9 away from the fixed sideplate 10 against the bias force of the spring 14 accompanied with an increase of the effective radius of the driving pulley 5 under the tension of the V-belt. On the other hand, when the movable sideplate 7 is moved away from the fixed sideplate 6, the transmission ration between shafts 2 and 3 is decreased, resulting from the increase of the effective radius of the driven pulley 9 to more than that of the driving pulley 5 by movement of the movable sideplate 11 of the driven pulley 9 toward the fixed sideplate 10 by the bias force of the spring 14 accompanied with a decrease of the effective radius of the driving pulley 5.

Moreover, in this embodiment of this invention, a fixed sleeve 22 is fixedly rotatably and axially non-slidably mounted on the input shaft 2 on the opposite side of the movable sideplate 7 from the fixed sideplate 6. A male screw 23 is formed on an outer circumference of the fixed sleeve 22 in screw engagement with a cylinder shaped moving member 16. The moving member 16 has an integrally formed flange facing the driven pulley 5, and a toothed pulley part 17 is formed as the first pulley member on the outer circumference. Moreover, the moving member 16 is relatively rotatably and axially fixedly connected to a boss part 7a of the movable sideplate 7 of the driving pulley 5 through a ball bearing 21. The moving member 16 is arranged to be axially movable on the input shaft 2 with the movable sideplate 7 through screw motion by the relative rotation of the moving member 16 around the input shaft 2. For example, when the moving member 16 is relatively rotated reversely to the input shaft 2 the movable sideplate 7 is moved away from the fixed sideplate 6 (to the right in the figure). On the contrary, when the moving member 16 is relatively rotated in the advanced direction to the input shaft 2, the moving member 16 is moved in the direction (the left in the figure) where the movable sideplate 7 is moved toward the fixed sideplate 7.

Also, a speed-shifting pulley mechanism 24 is provided for rotating the moving member 16 relatively around the input shaft 2. The speed-shifting pulley mechanism 24 is provided with a variable pulley 25 as the second pulley member fixedly rotatably mounted on the input shaft 2 on the outer circumference of the fixed sleeve 22. The variable pulley 25 is mounted on a cylindrical boss part 22a which is formed integrally with the fixed sleeve 22, surrounding part of the moving member 16. Namely, this pulley 25 is composed of a fixed sideplate 27 formed integrally with the boss part 22a, and a flange shaped movable sideplate 26 axially slidably and fixedly rotatably mounted on the cylindrical boss part 22a facing the fixed sideplate 27. A V-shaped belt groove 29 is formed between sideplates 26 and 27.

The movable sideplate 26 is connected to the movable sideplate 7 of the driving pulley 5 through a cam mechanism 30. Namely, in the cam mechanism 30 a cylindrical first cam 31 having an inclined cam face 31a is rotatably and non-slidably mounted around the boss part 26a of the movable sideplate 26 through a ball bearing 32. On the other part, the second cam 33 is rotatably and non-slidably mounted at the middle part of the moving member 16 through a ball bearing 34, and has an inclined cam face 33a engaging with the inclined cam face 31a of the first cam 31. Namely, the first cam 31 and the second cam 33 are connected with each other relatively rotatably and axially movably together for changing the distance therebetween in accordance with the contacting position. Also, the second cam 33 is mounted non-rotatably and axially movably on the input shaft 2 and is engaged with the casing 1 through a stopping lever 35 extended outwardly from its outer circumference and a regulation lever 36 which is fixed on the casing 1. Also, a rod shaped connecting part 40 is formed extended outwardly from the outer circumference of the first cam 31. The end of the connecting part 40 is connected to an operating lever (not shown) of a manual operation type which is adapted for rotating the first cam 31 around the input shaft 2 and which is placed on the outside of the casing 1. The effective radius of the variable speed pulley 25 is changable in by rotating the first cam 31 by handling the operating lever keeping cam engagement with the second cam 33 which is solidly mounted on the casing 1, and then the first cam 31 is axially moved on the input shaft 2 through the cam engagement in accordance with the movement of the movable sideplate 26 toward and from the fixed sideplate 27. Namely, both movable sideplates 26 and 7 connected to the first or second cam 31 or 33 are engaged with each other relatively movably changing the distance therebetween by a mode change of the operating lever.

Also, a fixed size pulley 45 acting as the third pulley member is axially rotatably mounted on the output shaft 3 facing the fixed sideplate 10 of pulley 9 and on ball bearings 48. A V-pulley part 46 the effective radius of which corresponds to the medium value of the variable range of the effective radius of the variable pulley 25 is integrally formed on the fixed size pulley 45. A V-belt 49 acting as the first belt is trained between the pulley 45 and variable pulley 25. Also, a toothed pulley part 47 the effective radius of which is nearly the same as that of the V-pulley part 46 is formed on the pulley 45 at the part facing the fixed sideplate 10. A toothed timing belt 50 acting as the second belt is trained between the toothed pulley part 47 and the toothed pulley part 17 of the moving member 16 in the above-mentioned arrangement, the moving member 16 is relatively rotated around the input shaft 2 by adjusting the rotational speed to be higher or lower than that of the input shaft 2 while rotating in the same direction as the shaft 2.

Thus, the moving member 16 is rotated relative to the input shaft 2 in the advanced or reverse direction by handling the operating lever. When the device is to be shifted to the low speed mode, as shown in FIG. 1, for example, the moving member 16 is relatively rotated around the input shaft 2 in the reverse direction in a manner such that the effective radius of the variable pulley 25 of the speed-shifting pulley mechanism 24 is decreased by handling the operating lever to decrease the transmission ratio between the variable pulley 25 and the V-pulley part 46 of the fixed size pulley 45. In accordance with this operation, the effective radius of the driving pulley 5 is decreased by the movement of the movable sideplate 7 away from the fixed sideplate 6 through the screw motion of the moving member 16 engaged with the male screw 23 of the fixed sleeve 22. On the other hand, when the device is to be shifted to the high speed mode, as shown in FIG. 2, the moving member 16 is relatively rotated around the input shaft 2 in the advanced direction in a manner such that the effective radius of the variable pulley 25 is increased to increase the transmission ratio between the variable pulley 25 and the V-pulley part 46 of the pulley 45. In accordance with this operation, the effective radius of the driving pulley 5 is increased, caused by the movement of the movable sideplate 7 toward the fixed sideplate 6 through the screw motion of the moving member 16.

The toothed pulley part 47 of the pulley 45 has a sufficiently wide outer circumference at the belt engaged face so the belt 50 will not slip off when the timing belt 50 at the toothed pulley part 17 is moved axially through the screw motion of the moving member 16.

Further, between the variable pulley 25 of the speed-shifting pulley mechanism 24 and the V-pulley part 46 of the pulley 45 is a bias mechanism 51 provided for biasing a slack part 49a (a part moving from the variable pulley 25 to the V-pulley part 46) of the V-belt 49 from its outside.

Figure 3:
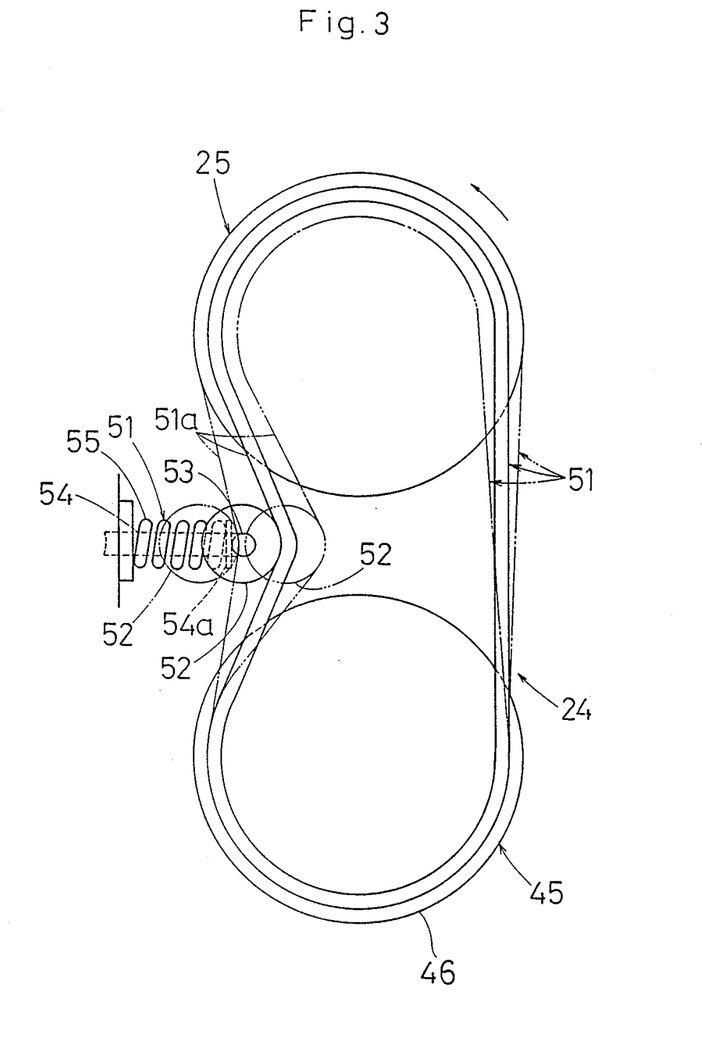
FIG. 3 is a side view showing a V-belt and a biased roller in the speed shifting condition of the speed-shifting device of FIG. 1.

The tension fluctuation of the belt 49 in accordance with adjusting of the effective radius of the variable pulley 25 is decreased by the bias mechanism 51. Specifically, the bias mechanism 51 is, as shown in FIG. 3, provided with a cylindrical tension roller 52 placed in contact with the V-belt 49 at the outer circumferential surface (back side) in the slack part 49a., a supporting shaft 53 parrallel with both shafts 2 and 3 axially rotatably supporting the tension roller 52, a pair of rods 54, (only one of them is shown) fixedly mounted to both end parts of the supporting shaft 53 movably supporting the tension roller 52 in a direction crossing at nearly a right angle to the plane through the input and output shaft 2 and 3 to the casing 1, and spring 55 mounted around each rod 54 being compressed between spring holders 54a and the casing 1 biasing the roller 52 and the supporting shaft 53 in the direction in which the tension of the V-belt 49 is increased. The V-belt is given tension in a manner such that the outer circumferential surface of the V-belt 49 is urged by the tension roller 52 with the bias force of each spring 55.

The operation of above described speed-shifting device is explained below.

In the usual condition, the moving member 16 engaging with the fixed size pulley 45 through the timing belt 50 trained therebetween is rotated with the input shaft 2 without any speed difference since the variable pulley 25 of the speed-shifting pulley mechanism 24 the effective radius of which is kept in the middle of the variable range is not shifted between the V-pulley part 46 of the fixed size pulley 45 on the output shaft 3. For this reason, the moving member 16 is not moved on the input shaft 2, and therefore the transmission ratio between the driving and driven pulleys 5 and 7, and between the input and output shafts 2 and 3 is kept constant.

When the device is to be shifted from this condition to the low speed mode by decreasing the transmission ratio between shafts 2 and 3, as shown in FIG. 1, the operating lever connected with operation part 40 of the first cam 31 is shifted to the low speed mode. In accordance with this shifting operation of the operating lever, the movable sideplate 26 of the variable pulley 25 is urged in the left direction in the figure away from the fixed sideplate 27, and the effective radius of the variable pulley 25 is decreased to the minimum value in the variable range. Accordingly, the rotational speed ratio between the variable pulley 25 and the fixed size pulley 45 is decreased, with the result that the moving member 16 driven by the timing belt 50 on the fixed size pulley 45 rotates with lower rotational speed than that of the input shaft 2. The moving member 16 is moved to the right in the figure on the input shaft 2 through screw motion by the relative rotation in the deceleration direction, and the movable sideplate 7 connected with the moving member 16 is moved away from the fixed sideplate 7 to decrease the effective radius of the driving pulley 5. In accordance with this decrease of the effective radius of the driving pulley 5, the V-belt 15 is drawn toward the driven pulley 9 by the bias force of the spring 14. Then the movable sideplate 11 is urged toward the fixed sideplate 10 by the movement of the V-belt 15, and the effective radius of the driven pulley 9 is increased. As a result, the rotation of the input shaft 2 in transmitted to the output shaft 3 with reduced speed since the effective radius of the driving pulley 5 is shifted to be smaller than that of the driven pulley 9.

Also, in accordance with screw motion of the moving member 16 in the right axial direction in the figure, the second cam 33 urges the first cam 31 to move the movable sideplate 26 of the variable pulley 25 in the right direction in the figure. Therefore, the effective radius of the variable pulley 25 is brought back to the previous medium value, and the screw motion of the moving member 16 is stopped keeping the transmission ratio between the input and output shafts 2 and 3 at a constant low value.

On the contrary, when the device is to be shifted to the high speed mode by increasing the transmission ratio between the input and output shaft 2 and 3, as shown in FIG. 2, the operating lever is shifted to the high speed mode. In accordance with this shifting operation, the movable sideplate 26 is moved in the right direction in the figure toward the fixed sideplate 27 against the bias force of the tension roller 51, and the effective radius of the variable pulley 25 is increased to the maximum value of the variable range. Accordingly, the rotational speed between variable pulley 25 and the fixed size pulley 45 is increased, with the result that the moving member 16 rotates with a higher rotational speed than that of the input shaft 2. The moving member 16 is moved to the left in the figure on the input shaft 2 through screw motion by the relative rotation in the acceleration direction, and the movable sideplate 7 is moved toward the fixed sideplate 6 to increase the effective radius of the driving pulley 5. In correspondence with this increase of the effective radius of the driving pulley 5, the V-belt 15 is drawn toward the driving pulley 5 against the bias force of the spring 14. Then, the movable sideplate 11 is moved away from the fixed sideplate 10 by the movement of the V-belt 15, and the effective radius of the driven pulley 9 is decreased. As a result, the rotation of the input shaft 2 is transmitted to the output shaft 3 with reduced speed since the effective radius of the driving pulley 5 is shifted to be larger than that of the driven pulley 9.

During this process, the second cam 33 is moved in the left direction with the first cam 31, therefore, the movable sideplate 26 is moved away from the fixed sideplate 27 to bring the effective radius of the variable pulley 25 back to the medium value. As a result, screw motion of the moving member 16 is stopped keeping the transmission ratio between shaft 2 and 3 at a constant high value.

Therefore, in the speed-shifting device of this embodiment, the moving member 16 is relatively rotated around the input shaft 2 in an advanced or reverse direction by the speed-shifting effect between the variable pulley 25 on the input shaft 2 and the fixed size pulley 45 on the output shaft 3 to axially move the movable sideplate 7 of the driving pulley 5 through screw motion. For this reason, the arrangement for moving the movable sideplate 7 is extremely simple and is easily controlled. Also, the speed-shifting process between the input and output shafts 2 and 3 can be done smoothly with a small handling force since the moving member 16 is moved by the speed-shifting pulley mechanism 24. Moreover, durability of the speed-shifting device is improved since few parts are heated during the speed-shifting process.

Further, since a conventionally required servomotor with its high cost is not necessary as the driving source of the movable sideplate 7 because the movable sideplate 7 is moved axially by utilizing the relative rotation of the input shaft 2 to the moving member 16 mounted thereon, the device of the invention can be manufactured at low cost.

Moreover, the transmission ratio can be varied in the range corresponding to the moving range of the first cam 31, and at the same time, the transmission ratio between shafts 2 and 3 is settled at that ratio when screw motion of the moving member 16 is stopped automatically since the effective radius of the variable pulley 25 is varied in correspondence with the contacting position between the first cam 31 and the second cam 33.

In addition, the first cam 31 in the above described embodiment may be operated automatically.

Also, the movable sideplate 7 of the driving pulley 5 provided on the input shaft 2 is arranged to be moved with the moving member 16 in the above described embodiment. However, the movable sideplate 11 of the driven pulley provided on the output shaft 3 may be arranged to be moved through screw motion, wherein the same effects can be achieved as in above described embodiment.

Furthermore, in the above described embodiment, the variable pulley 25 of the speed-shifting pulley mechanism 24 is mounted on the output shaft 3. However, those pulleys may be arranged inversely. Also, the fixed size pulley 45 can be rotatably mounted on another shaft parallel with shafts 2 and 3.

FIG. 4–FIG. 7 show the second embodiment of this invention. Since the basic arrangement of this embodiment is the same as the first embodiment, a detailed explanation of the same parts equivalent to the first embodiment is omitted.

In this second embodiment, the variable pulley 25 of the speed-shifting pulley mechanism 24 is connected to the moving member 16 with a screw, not with the cam mechanism as in the first embodiment.

Figure 4:
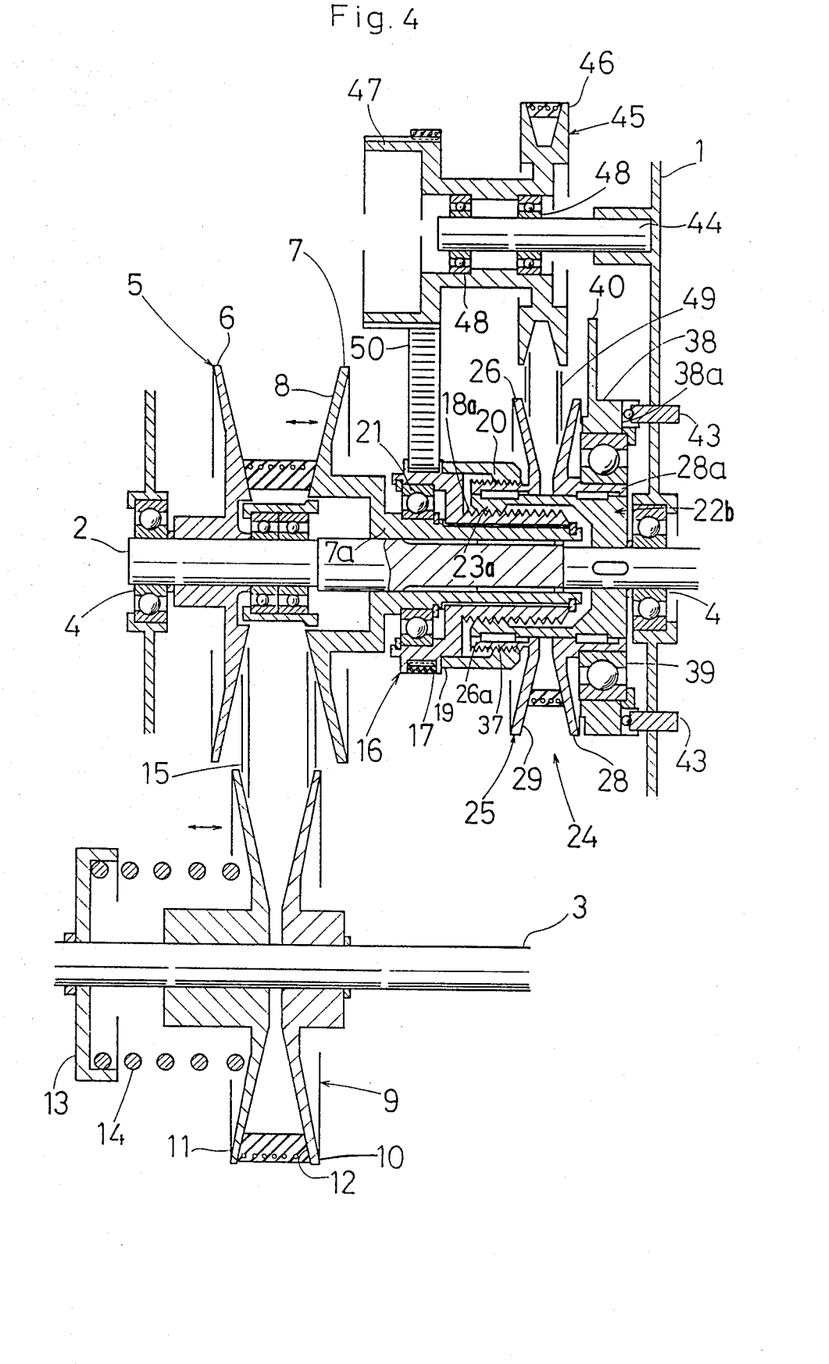
FIG. 4 is a sectional elevation partly of a second embodiment of a speed-shifting device of the invention in the low speed mode.
Figure 5:
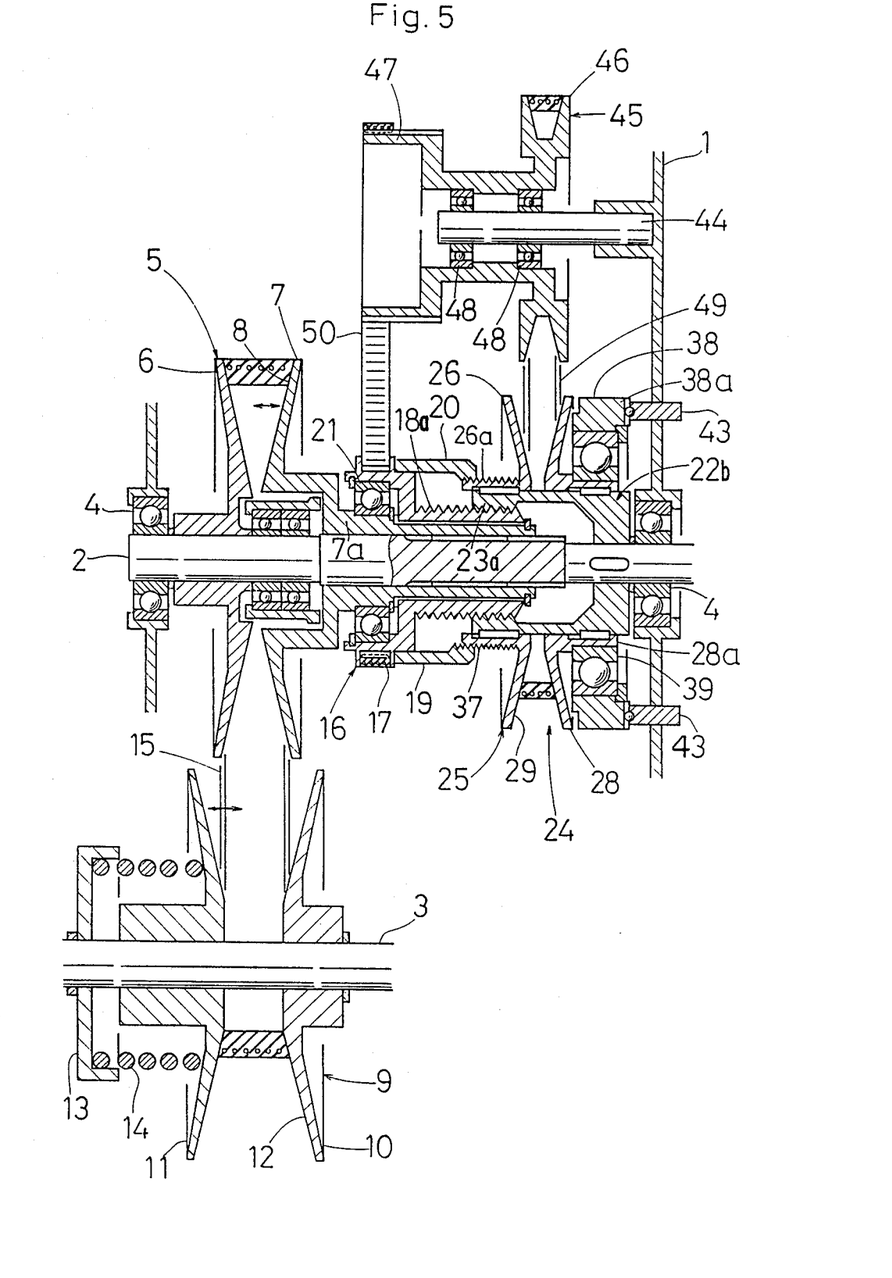
FIG. 5 is a view similar to FIG. 4 of the speed-shifting device in the high speed mode.
Figure 6:
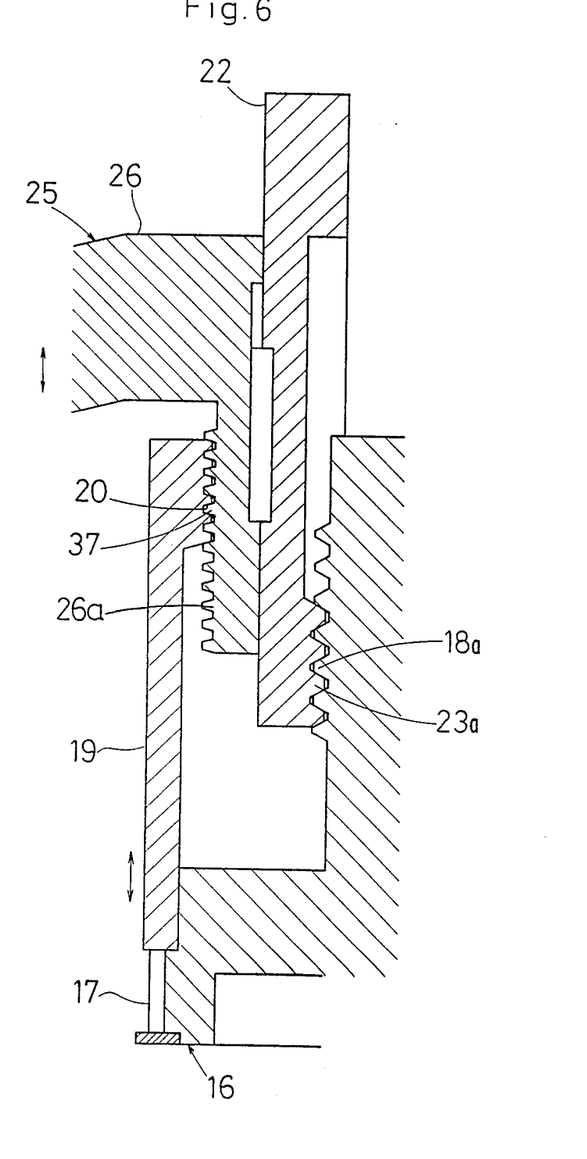
FIG. 6 is a sectional view, on an enlarged scale of a principal part of the device of FIG. 5.

Namely, as a characteristic of this embodiment, as shown in FIG.4–FIG. 6, a cylindrical shaped moving member 16 is relatively rotatably mounted on boss part 7a of the movable sideplate 7 of the driving pulley 5 through the ball bearing 21 and is held in a fixed position in the axial direction. The male screw 18a on the moving member 16 is formed on an outer circumference on the opposite end from the driving pulley 5. A cylinder 19 formed concentrically with the male screw 18a is fixedly connected with the moving member 16 adjacent to the toothed pulley 17, and has a female screw 20 formed along an inner circumference thereof (the face confronting the male screw 18a).

Also, a cylindrical sleeve 22b formed so as to surround the male screw 18a of the moving member 16 is fixedly mounted on the input shaft 2 and has a female screw 23a formed along an inner circumference thereof and engaged with the male screw 18a of the moving member 16.

The speed-shifting pulley mechanism 24 is provided with the variable pulley 25 as the second pulley member mounted on the sleeve 22b arranged to be rotatable with the input shaft 2. The variable pulley 25 is composed of the flange shaped first movable sideplate 26 axially slidably and fixedly rotatably mounted on the sleeve 22b (on the input shaft 2) by a key and having a cylindrical boss part 26a which is disposed at the inside of the cylinder 19, and the flange shaped second movable sideplate 28 axially slidably and rotatably fixedly mounted on the sleeve 22b by a key and facing the first movable sideplate 26 and having a cylindrical shaped boss part 28a. The V-shaped belt groove 29 is formed between sideplates 26 and 28.

Also, an outer circumference of the boss part 26a of the first movable sideplate 26 is provided with a male screw 37 for engaging with the female screw 20 of the cylinder 19. Namely, the first movable sideplate 26 is in screw engagement with the moving member 16 through a screw means with a pitch (the screw pitch of the female screw 20 and the male screw 37) smaller than between the moving member 16 and the input shaft 2 (the screw pitch of the female screw 23a and the male screw 18).

Figure 7:
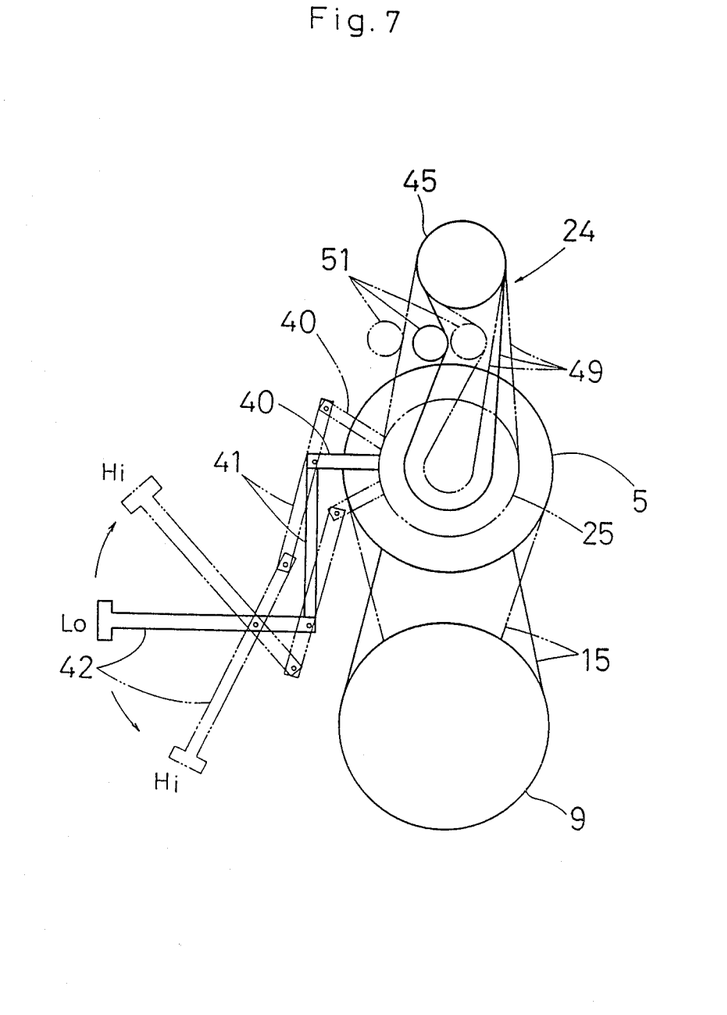
FIG. 7 is a schematic view showing the movement of the speed-shifting pulley mechanism and the biased roller occurring during handling of an operating lever.

On the other hand on the outer circumference of the boss part 28a of the second movable sideplate 28, a ring shaped cam member 38 is relatively rotatably and axially non-slidably connected to the fixed sleeve 22b through a ball bearing 39, wherein a cam face 38a having a pair of crest parts and through parts formed along the side face confronting the casing 1. The cam member 38 has an integrally formed connecting part 40 extending from the outer circumference thereof and connecting to the operating lever 42 through a linkage 41, as shown in FIG. 7. A pair of free rollers 43 adapted for contacting with the cam face 38a of the cam member 38 are fixed on the casing 1 at the part facing the cam member 38. The cam member 38 is arranged to be moved axially when rotated relatively to the free rollers 43, through teh connecting part 40 by operating the 42 for changing the mode between Lo position (neutral mode) and the Hi position (advanced mode or reverse mode), as shown in FIG. 7. For example, when the operating lever 42 is shifted to the Lo position, the cam member 38 is urged to the right in FIG. 4 in a manner such that the cam member 38 is connected with the free roller 43, at the through part of the cam face 38a under the bias force of the belt 49. Conversely, when the operating lever 42 is shifted to the Hi position, the cam member 38 is moved toward the belt 49 in the manner that the cam member 38 is contacted with the free roller 43, at the crest part of the cam face 38a. At the same time, the effective radius of the variable pulley 25 is adjusted by moving the second movable sideplate 28 toward and away from the first movable sideplate 26.

The speed-shifting characteristics at the time of advancing and reversing can be different from each other when the angle of inclination (the angle from the through part toward the crest part) of the cam face 38a of the cam member 38 from the Lo position to the Hi position of the advance mode is varied to that from Lo position to Hi position of the reverse mode during the shifting operation of the operating lever 42.

A fixed shaft 44 is mounted on the casing 1 parallel with output shaft 3 with the input shaft 2 between shafts 44 and 43. The fixed size pulley 45 is rotatably mounted on the fixed shaft 44 through ball bearings 48, and V-belt 40 acting as the first belt is trained between the pulley 45 and the variable pulley 25.

Therefore, the speed-shifting pulley mechanism 24 is shifted into the speed shifting condition by adjusting the effective radius of the variable pulley 25 in a manner such that the second movable sideplate 28 of the variable pulley 25 is moved toward and away from the first movable sideplate 26 by the mode change of the operating lever 42. Also, the speed-shifting pulley mechanism 24 is arranged to be stabilized to the constant speed condition in a manner such that the first movable sideplate 26 is moved toward and away from the second movable sideplate 28 with smaller movement than that of the moving member 16 during the speed shifting condition based on a difference of the screw pitch between the screw of the input shaft 2 and that of the first movable sideplate 26 to the moving member 16.

The operating lever 42 is connected with a mechanism for changing into the advance or reverse mode (not shown) arranged so that the last output shaft is rotated in the advancing direction when the operating lever 42 is changed into the advance mode and in the reverse direction when it is changed into the reverse mode.

The operation of a speed-shifting device of this embodiment is explained below.

Usually, the speed-shifting pulley mechanism 42 is in the constant speed condition. Therefore, the moving member 16 is not moved on the input shaft 2 keeping the transmission ratio constant between the driving and driven pulleys 5 and 9 on the input and output shafts 2 and 3.

When the device is to be shifted from this condition, for example, into the low speed mode where the transmission ratio between the input and ouput shaft 2 and 3 is decreased as shown in FIG. 4, the operating lever 42 is moved in the direction toward the Lo position (neutral mode). In accordance with this mode change of the operating lever 42, the effective radius of the variable pulley 25 is decreased in a manner such that the second movable sideplate 28 which is integrally formed with the cam member 38 is moved away from the first movable sideplate 26 while the cam member 38 is moved in the right direction in FIG. 5 by a bias force of the bias mechanism 51 of the V-belt 49. By this process, the effective radius of the driving pulley 5 is decreased and the transmission ratio between the variable pulley 25 and the pulley 45 is decreased to rotate the moving member 16 at a lower rotational speed than that of the input shaft 2, with the result that the moving member 16 is moved through screw motion in the right direction in the figure on the input shaft 2 and the movable sideplate 7 is moved away from the fixed sideplate 6 thereby. In accordance with this decrease of the effective radius of the driving pulley 5, the movable sideplate 11 is moved toward the fixed sideplate 10 to increase the effective radius of the driven pulley 9. As a result, the rotation of the input shaft 2 is transmitted to the output shaft 3 with decreased speed.

Moreover, accompanying the screw motion of the moving member 16 in the right direction in the figure, the first movable sideplate 26 is moved in the right direction with a time delay, since the first movable sideplate 26 of the variable pulley 25 is in screw engagement with the moving member 16 with a smaller screw pitch than between the moving member 16 and the input shaft 2 in the cylinder 19. As shown in FIG. 4, when the effective radius of the variable pulley 25 is brought back to the previous medium value by the movement of the first movable sideplate 26, the screw motion of the moving member 16 is stopped keeping the transmission ratio between the input and output shafts 2 and 3 at the constant low value.

On the other hand, when the device is to be shifted into the high speed mode where the transmission ratio between the input and output shaft 2 and 3 is increased, the operating lever 42 is changed in the direction toward the Hi position. Then, the cam member 38 which is in cam contact with the free rollers 43 fixed on the casing 1 is moved in the left direction in FIG. 4 to move the second movable sideplate 28 of the variable pulley 25 toward the first movable sideplate 26, with the result that the effective radius of the variable pulley 25 is increased. Therefore, the transmission ratio between the variable pulley 25 and the pulley 45 is increased to rotate the moving member 16 with screw motion to the left in the figure on the input shaft 2, and then, the movable sideplate 7 is moved toward the fixed sideplate 6 to increase the effective radius of the driving pulley 5. In accordance with this increase of effective radius of the driving pulley 5, the movable sideplate 11 is moved away from the fixed sideplate 10 to decrease the effective radius of the driven pulley 9 as a result, the rotation of the input shaft 2 is transmitted to the output shaft 3 with increased speed.

In parallel with this process, accompanying the screw motion of the moving member 16 in the left direction, the first movable sideplate 26 is moved in the left direction in the figure with a time delay. Caused by this, as shown in FIG. 5, when the effective radius is brought back in the previous medium value by the movement of the second movable sideplate 28 of the variable pulley 25 way from the first movable sideplate 26, screw motion of the moving member 16 is stopped keeping the transmission ratio between the input and output shaft 2 and 3 at the constant high value.

In the case of this embodiment, especially, the variable pulley 25 is composed of the first and second movable sideplates 26 and 28, wherein the first movable sideplate 26 is in screw engagement with the moving member 16 at a smaller pitch than between the moving member 16 and the input shaft 2. Therefore, the transmission ratio between the input and output shafts 2 and 3 can be changed in the manner that the second movable sideplate 28 is moved toward and away from the first movable sideplate 26 only by the rotation of the cam member 38 by moving the operating level 42. Also, since the link length ratio can be increased by moving the movable sideplate 7 of the driving pulley 5 between the low speed mode and the high speed mode, there is an advantage that the handling force of the operating lever 42 is reduced.

Concretely, for example, when the screw pitch between the first movable sideplate 26 and the moving member 16 (the screw pitch of the female screw 20 and the male screw 37) is 10 mm and the screw pitch between the moving member 16 and the input shaft 2 (the screw pitch of the female screw 23a and the male screw 18) is 12 mm, in the case when the required stroke of the movable sideplate 7 during speed-shifting is 24 mm, the movable sideplate 7 can be moved through the required stroke 24 mm with a cam stroke 4 mm of the cam member 38. When the stroke of the operating lever 42 is 200 mm, the link length ratio is increased fifty times.

Moreover, even when the operating lever 42 is moved with higher speed than the moving speed of the movable sideplate 7 of the driven pulley 5, a large handling force of the operating lever 42 is not required since the movement thereof occurs through the shift of the transmission ratio of the speed-shifting pulley mechanism 24.

The rotational operation of the cam member 38 in the second emodiment may be controlled automatically, Also, the movable sideplate 11 of the driving pulley 9 on the output shaft 3 may be moved through screw motion, with the same effect as in the above-mentioned embodiment. Moreover, the pulley 45 may be provided on the output shaft 3, not on the fixed shaft 44.

In this invention, the arrangement of the movable sideplate is simplified and is easy to control, and also manufacturing cost is lowered, the durability is improved, and the device is prevented from heating up during shifting, so it can be utilized for a transmission device in motor cycles and agricultural implements and the like providing a pulley type speed-shifting device where a rather small driving load in required.

I claim:

1. In a speed-shifting device having first transmission shaft and a second transmission shaft parallel thereto, a driving pulley and a driven pulley each of which is composed of a fixed sideplate fixedly rotatably and axially non-slidably mounted on each of said transmission shafts and a movable sideplate axially slidably and fixedly rotatably mounted on each of said transmission shafts and forming a V-shaped groove with the corresponding fixed sideplate, and a belt member trained between said driving pulley and said driven pulley engaging in both V-shaped grooves whereby the transmission ratio between the transmission shafts can be changed by varying the effective radius of the engagement of each of said pulleys with said belt member by moving each said movable sideplate axially toward and away from the fixed sideplate facing thereto, the improvement comprising:

a moving member fixedly axially connected to and relatively rotatably connected to said movable sideplate on said first transmission shaft and being relatively rotatably and axially movably supported on said first transmission shaft, and screw thread means connected between said moving member and said first transmission shaft for causing relative axial movement of said moving member to said first transmission shaft when said moving member is rotated at a speed different from the speed of rotation of said first transmission shaft;

a speed shifting pulley mechanism adapted for adjusting the transmission ratio between said transmission shafts and having a first pulley member fixed on said moving member, a second pulley member fixedly rotatably mounted on said first transmission shaft, a third pulley member rotatably mounted for rotation around an axis parallel with said first transmission shaft and having two pulley parts, a first belt trained between said second pulley member and one of said pulley parts of said third pulley member and a second belt trained between said first pulley member and the other of said pulley parts of said third pulley member, means for changing the transmission ratio of one of said first and second belts from a normal transmission ratio to a shifted transmission ratio for transmitting the rotation of said first transmission shaft to said moving member at a shifted speed for rotating said moving member relatively around said first transmission shaft for moving the movable sideplate on said first transmission shaft relative to the fixed sideplate thereon.

2. A speed-shifting device as claimed in claim 1 wherein said axis around which said third pulley member is rotatable is the axis of rotation of said second transmission shaft.

3. A speed shifting device as claimed in claim 1 further comprising an additional shaft parallel to said first transmission shaft, and wherein said axis around which said third pulley member is rotatably is the axis of rotation of said additional shaft.

4. A speed shifting device as claimed in claim 1, 2 or 3 in which said first transmission shaft is an input shaft and said second transmission shaft is an output shaft.

5. A speed shifting device as claimed in claim 1, 2 or 3 wherein said second pulley member is a variable effective diameter pulley, said one pulley part of said third pulley member is a fixed diameter pulley and the other of said pulley part of said third pulley member and said first pulley member are toothed pulleys, said first belt is a V-shaped belt, and said second belt is a toothed timing belt, and said device further comprises a biased roller engaing said first belt for tensioning said first belt, whereby the rotation of said first transmission shaft is transmitted to said moving member by adjusting the effective diameter of said second pulley member for shifting the speed of said first belt.

6. A speed shifting device as claimed in claim 1, 2 or 3 further comprising means forming part of said speed shifting pulley mechanism for, after the transmission ratio of the said one of said belts has been shifted, changing the transmission ratio back to the normal transmission ratio after a time delay.

7. A speed shifting device as claimed in claim 6 further comprising a casing for said speed device and wherein said second pulley member comprises a fixed sideplate fixedly rotatably and axially non-slidably mounted on said first transmission shaft and a movable sideplate fixedly rotatably and axially slidably mounted on said first transmission shaft facing said fixed sideplate of said second pulley member and defining a V-shaped groove therewith, and said means for changing the transmission ratio back to the normal transmission ratio comprises a cam mechanism operably engaged between said movable sideplate of said second pulley member and said movable member and having a driven cam which is axially fixedly and relatively rotatably mounted on said moving member and axially movably and non-rotatably engaged with said casing, and a driving cam axially fixedly and relatively rotatably mounted on said movable sideplate of said second pulley member and in caming engagement with said driven cam.

8. A speed shifting device as claimed in claim 6 wherein said second pulley member comprises first and second movable sideplates fixedly rotatably and axially slidbly mounted on said first transmission shaft and defining a V-shaped groove therebetween, and said means for changing the transmission ratio back to the normal transmission ratio comprises a further screw thread means connected between said moving member and said first movable sideplate and having a screw thread pitch smaller than said firstmentioned screw thread means, and operating lever means connected to said second movable sideplate for initially moving said second sideplate away from said first sideplate for changing the transmission ratio.

9. A speed shifting device as claimed in claim 8 in which said operating lever means comprises an operating cam means for controlling the amount by which said second sideplate is initially moved away from said first sideplate, a link means connected with said cam mechanism, and an operating lever connected with said link means.

* * * * *